US011081999B2

(12) United States Patent
Tobayashi et al.

(10) Patent No.: US 11,081,999 B2
(45) Date of Patent: Aug. 3, 2021

(54) POWER CONVERSION APPARATUS

(71) Applicant: Toshiba Mitsubishi-Electric Industrial Systems Corporation, Chuo-ku (JP)

(72) Inventors: Shunsuke Tobayashi, Tokyo (JP); Toshiaki Oka, Tokyo (JP)

(73) Assignee: Toshiba Mitsubishi-Electric Industrial Systems Corporation, Chuo-ku (JP)

( * ) Notice: Subject to any disclaimer, the term of this patent is extended or adjusted under 35 U.S.C. 154(b) by 0 days.

(21) Appl. No.: 16/807,217

(22) Filed: Mar. 3, 2020

(65) Prior Publication Data
US 2020/0204103 A1    Jun. 25, 2020

Related U.S. Application Data

(63) Continuation of application No. PCT/JP2017/032514, filed on Sep. 8, 2017.

(51) Int. Cl.
*H02P 27/08* (2006.01)
*H02P 21/22* (2016.01)
(Continued)

(52) U.S. Cl.
CPC .......... *H02P 27/08* (2013.01); *H02M 5/4585* (2013.01); *H02M 7/5395* (2013.01); *H02P 21/14* (2013.01); *H02P 21/22* (2016.02)

(58) Field of Classification Search
None
See application file for complete search history.

(56) References Cited

U.S. PATENT DOCUMENTS 4,894,763 A * 1/1990 Ngo .................... H02J 3/36
                                                318/803
5,212,438 A   5/1993 Miyazaki et al.
(Continued)

FOREIGN PATENT DOCUMENTS

JP    57-40394 A    3/1982
JP    1-177895 A    7/1989
(Continued)

OTHER PUBLICATIONS

Extended European Search Report dated Feb. 17, 2021 in European Patent Application No. 17924336.5, 12 pages.
(Continued)

*Primary Examiner* — Bentsu Ro
(74) *Attorney, Agent, or Firm* — Oblon, McClelland, Maier & Neustadt, L.L.P.

(57) ABSTRACT

A power conversion apparatus comprises, a converter that receives a three-phase AC power supply 1 and outputs a DC voltage, an inverter that is connected to the output of the converter and drives the AC motor via the output switch, a power switch for directly driving an AC motor from the AC power supply, a current detector for detecting the output current of the inverter, a voltage detector and a current detector for detecting the voltage and current of the power supply system on the input side of the converter, respectively, and a control unit for controlling the three-phase output voltage of the inverter based on the voltage command of three phases. The control unit includes a vector control unit that performs vector control of the AC motor and a synchronous incorporation controller. The synchronous incorporation controller switches to operate the inverter as a reactive power controller for the power supply system after closing the power switch to synchronize the AC motor with the AC power supply.

8 Claims, 6 Drawing Sheets

(51) Int. Cl.
*H02M 5/458* (2006.01)
*H02M 7/5395* (2006.01)
*H02P 21/14* (2016.01)

(56) References Cited

U.S. PATENT DOCUMENTS

| | | | |
|---|---|---|---|
| 5,387,855 | A | 2/1995 | Miyazaki et al. |
| 5,483,140 | A * | 1/1996 | Hess .................. H02M 5/4505 318/722 |
| 2009/0237016 | A1* | 9/2009 | Iwashita ................. H02J 7/345 318/400.3 |
| 2010/0142236 | A1* | 6/2010 | Lee ...................... H02M 1/143 363/74 |
| 2014/0085953 | A1* | 3/2014 | Mao ..................... H02M 7/537 363/131 |
| 2017/0063282 | A1 | 3/2017 | Oka |
| 2018/0123498 | A1* | 5/2018 | Tanabe ................. H02P 29/025 |

FOREIGN PATENT DOCUMENTS

| | | |
|---|---|---|
| JP | 1-186187 A | 7/1989 |
| JP | 5-83989 A | 4/1993 |
| JP | 8-9682 A | 1/1996 |
| JP | 8-182386 A | 7/1996 |
| JP | 2001-197683 A | 7/2001 |
| JP | 2006-271071 A | 10/2006 |
| WO | WO 2015/173892 A1 | 11/2015 |

OTHER PUBLICATIONS

International Search Report dated Oct. 3, 2017 in PCT/JP2017/032514 filed Sep. 8, 2017, 1 page.

* cited by examiner

POWER CONVERSION APPARATUS

CROSS-REFERENCE TO RELATED APPLICATION

This application is based upon and claims the benefit of priority from the prior PCT Patent Application No. PCT/JP2017/032514, filed on Sep. 8, 2017, the entire contents of which are incorporated herein by reference.

TECHNICAL FIELD

The present invention relates to a power conversion apparatus, and more particularly to a power conversion apparatus having both a synchronous incorporation function and a reactive power control function.

BACKGROUND ART

There are two types of driving AC motors: fixed frequency driving with a commercial AC power supply and variable frequency driving with an inverter. The former is difficult to change the operating speed of the AC motor, but can be operated at constant speed without loss of the converter. Conversely, the latter can drive the AC motor at a variable speed, but a loss of the converter occurs. In the former case, since a large inrush current is required for starting a large-capacity AC motor, some device for preventing this has been required. For this reason, as a configuration that takes advantage of both, a drive system that switches between a commercial AC power supply drive and a drive by an inverter as necessary has been put into practical use. In order to employ such a drive system, a so-called synchronous incorporation function is required in which the inverter is operated in parallel with a commercial AC power supply for a short time without shock. And a method of performing this synchronous incorporation function simply and rationally is proposed (for example, refer patent document 1). Moreover, regarding the synchronous control of the AC power supply and the inverter required at the time of synchronous incorporation, various methods for matching the voltage and frequency of the AC power supply and the inverter, and further matching the phases have been proposed (for example, Patent Document 2 and Patent Document 3).

PRIOR ART DOCUMENT

Patent Document

Patent Document 1: International Patent Publication No. 2015/173892
Patent Document 2: Japanese Patent Publication No. H8-182386
Patent Document 3: Japanese Patent Publication No. 2001-197683

SUMMARY OF THE INVENTION

Problem to be Solved by the Invention

The power conversion apparatus shown in Patent Document 1 performs synchronous incorporation using a speed reference of an AC motor as a trigger signal, and the synchronous incorporation is performed to switch from driving the motor by an inverter to a commercial AC power supply. However, there has been a problem that the inverter was not utilized after the switching at all. This problem also applies to Patent Document 2 and Patent Document 3.

The present invention has been made in view of the above problems. The purpose is to provide a power conversion apparatus that effectively uses the inverter even after switching from driving by the inverter to driving by the commercial AC power supply after performing the synchronous incorporation.

Means for Solving the Problem

In order to achieve the above object, a power conversion apparatus according to claim 1 of the present invention comprises a converter that receives a three-phase AC power supply and outputs a DC voltage, an inverter connected to the output of the converter and drives an AC motor via an output switch, a power switch for directly driving the AC motor with the AC power supply, a first current detector for detecting an output current of the inverter, a voltage detector and a second current detector for detecting the voltage and current of the power supply system on the input side of the converter, respectively, and a control unit for controlling the three-phase output voltage of the inverter based on a first three-phase voltage command, the control unit involves a speed controller that outputs a first Q-axis current reference by controlling so that a deviation between a given speed reference and a speed feedback obtained directly or indirectly of the AC motor is minimized, a first 3-phase to 2-phase converter for converting a three-phase current detected by the first current detector into a first Q-axis current feedback and a first D-axis current feedback based on a first reference phase, a first Q-axis current controller that outputs a first Q-axis voltage reference by controlling so that the deviation between the first Q-axis current reference via the first switch and the first Q-axis current feedback is minimized, a first D-axis current controller that outputs a D-axis voltage reference by controlling so that the deviation between a first D-axis current reference corresponding to a given magnetic flux reference via a second switch, and the first D-axis current feedback is minimized, a first 2-phase to 3-phase converter that converts the first Q-axis voltage reference and the first D-axis voltage reference into the first three-phase voltage command based on the first reference phase, an operation circuit for obtaining an output frequency of the inverter by computation from the speed feedback, the first Q-axis current reference, and the magnetic flux reference, and integrates the obtained output frequency to obtain the first reference phase, a phase synchronization circuit for obtaining a second reference phase by using the output of the voltage detector as an input, a third switch for switching between the first reference phase and the second reference phase, a reactive power detection circuit for detecting reactive power of the power supply system from the voltage detector and the second current detector, a reactive power controller that outputs a second D-axis current reference by controlling so that the deviation between the reactive power and a predetermined reactive power reference is minimized, and a synchronous incorporation controller for switching the AC motor from driving by the inverter to driving by the AC power supply, wherein, the synchronous incorporation controller adjusts the speed of the AC motor and the output voltage of the inverter to match the voltage, output frequency and phase of the AC power supply and the inverter, and turns on the power switch to make the synchronous incorporation, and then the first to third switches are switched to perform reactive power control of the power system including the drive system of the AC motor by the inverter.

EFFECTS OF THE INVENTION

According to the present invention, it is possible to provide a power conversion apparatus that effectively utilizes an inverter even after switching from driving by an inverter to driving by a commercial AC power supply after performing synchronous incorporation.

EMBODIMENT TO PRACTICE THE INVENTION

Hereinafter, embodiments of the present invention will be described with reference to the drawings.

Embodiment 1

Figure 1:
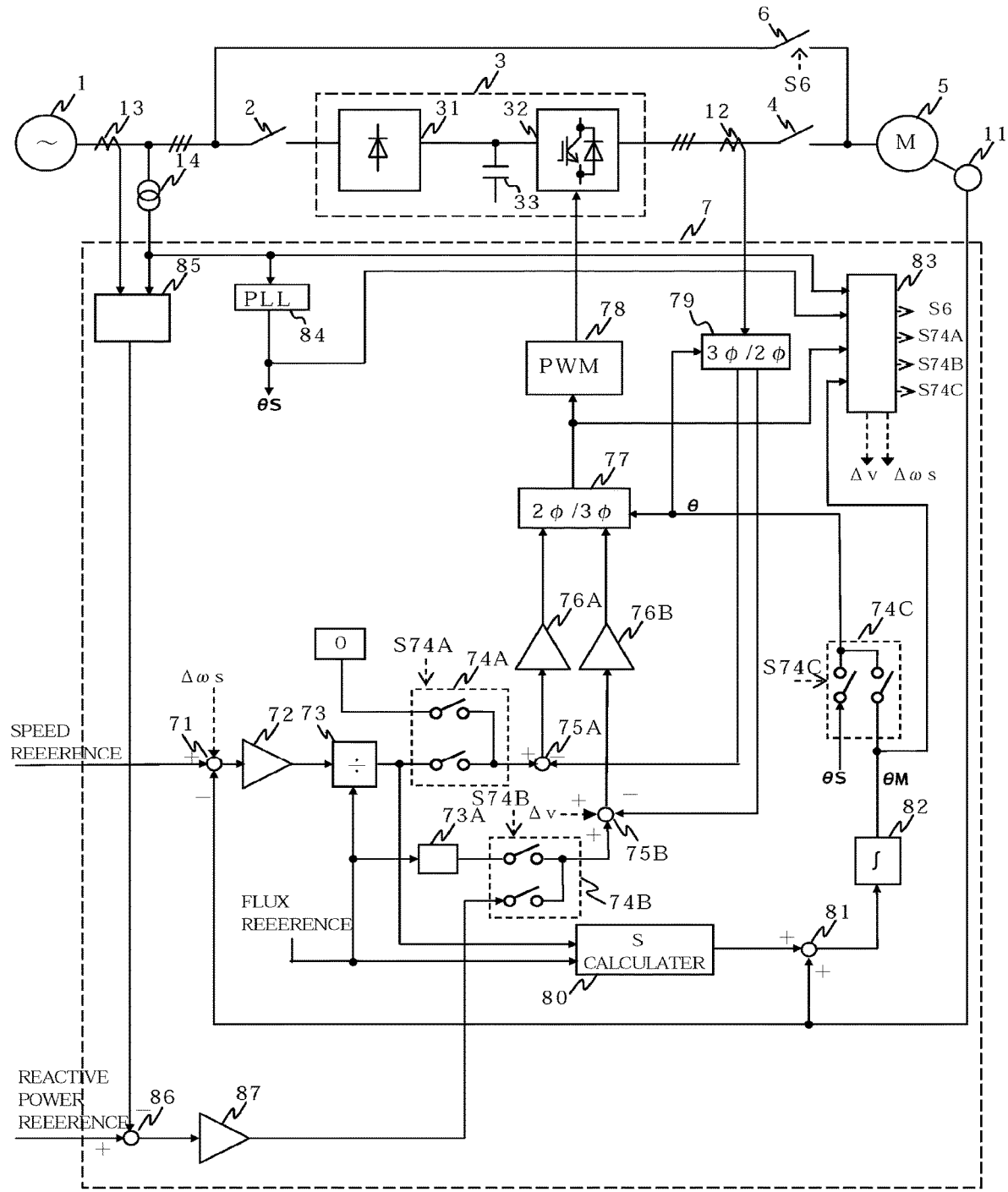
FIG. 1 is a circuit configuration diagram showing Embodiment 1 of a power conversion apparatus according to the present invention.

FIG. 1 is a circuit configuration diagram of a power conversion apparatus according to Embodiment 1 of the present invention. A commercial three-phase AC power supply 1 is connected to the AC power supply side of an input switch 2 via a current detector 13. Furthermore, the power converter side of the input switch 2 is connected to the diode converter 31 of the power converter 3. The power converter 3 includes a diode converter 31, a DC capacitor 33, and an inverter 32. The direct current output of the diode converter 31 is smoothed by the direct current capacitor 33 and inputs it to the inverter 32. The AC output of the inverter 32 drives the AC motor 5 through the current detector 12 and further through the output switch 4. Further, a switch 6 is provided so that the AC motor 5 can be directly driven from the AC power supply 1. That is, the AC power supply side of the switch 6 is connected to the AC power supply side of the input switch 2, and the AC motor side of the switch 6 is connected to the AC motor side of the output switch 4.

The inverter 32 is a voltage type PWM converter. Power devices constituting the inverter 32 are on/off controlled by a gate signal supplied from the control unit 7. A speed detector 11 is attached to the AC motor 5, and this output is given to the control unit 7. Further, the current detector 12 is provided on the output side of the inverter 32, and this output is also given to the control unit 7. A current detector 13 and a voltage detector 14 are provided on the AC power supply side of the input switch 2. Outputs of the current detector 13 and the voltage detector 14 are also given to the control unit 7.

Next, the internal configuration of the control unit 7 will be described. First, the case where the AC motor 5 is driven at a variable speed with the switch 6 turned off and the input switch 2 and the output switch 4 turned on will be described. Here, the operation signal S6 of the switch 6 is operated by the synchronous incorporation controller 83 described later. Here, the case where the AC motor 5 is driven at a variable speed is referred to as a motor drive mode.

A speed reference given from the outside is connected to the first input of the adder/subtractor 71. A speed fine adjustment signal $\Delta\omega s$, which is an output of a synchronous incorporation controller 83 described later, is inputted to the second input of the adder/subtractor 71. The speed fine adjustment signal $\Delta\omega s$, which is the output of the synchronous incorporation controller 83, is set to 0 during the period in which the AC motor 5 is started and variable speed driving is performed. The speed feedback obtained by the speed detector 11 is connected to a third input of the adder/subtractor 71. In the adder/subtractor 71, the difference between the third input from the sum of the first input and the second input is calculated, and is supplied to a speed controller 72. The speed controller 72 is, for example, a PI controller. Then, the speed controller 72 adjusts and controls the applied difference so as to be the minimum, and outputs a torque reference. This torque reference is divided by a magnetic flux reference separately set, by the divider 73 to become a torque current reference. This torque current reference is connected to a first input of the switch 74A. Also, 0 is inputted to a second input of the switch 74A. An output of the switch 74A is connected to a subtractor 75A. A switching signal S74A of the switch 74A is operated by the synchronous incorporation controller 83 described later. During the period of the motor drive mode in which the AC motor 5 is activated and driven at a variable speed, the switching signal S74A of the switch 74A is set so that the output of the switch 74A selects the first input. Therefore, during this period, the torque current reference is applied to the first input of the subtractor 75A via the switch 74A. Further, the magnetic flux reference is obtained by giving the magnetic flux reference to a magnetic flux current converter 73A. The magnetic flux current reference, which is the output of the magnetic flux current converter 73A, is connected to a first input of a switch 74B. An output of a reactive power controller 87 described later is connected to a second input of the switch 74B. An output of the switch 74B is connected to a first input of the adder/subtractor 75B. A switching signal S74B of the switch 74B is operated by the synchronous incorporation controller 83 described later. During the motor drive mode, the switching signals 74B of the switch 74B is set so that the output of the switch 74B selects the first input. Therefore, during this period, the magnetic flux current reference is supplied to the adder/subtractor 75B via the switch 74B. A voltage fine adjustment signal $\Delta v$, which is an output of a synchronous incorporation controller 83 described later, is inputted to a second input of the adder/subtractor 75B. Further, during the period of the motor drive mode, the voltage fine adjustment signal $\Delta v$ that is the output of the synchronous incorporation controller 83 is set to be zero.

A three-phase output current detected by the current detector 12 is given to a 3-phase to 2-phase converter 79. The 3-phase to 2-phase converter 79 converts the three-phase current into biaxial DC current components orthogonal to each other using a reference phase $\theta$ that is an output of a switch 74C described later. By appropriately selecting the reference phase θ, the two-axis current components can be Q-axis current feedback as torque current feedback and D-axis current feedback as magnetic flux current feedback orthogonal thereto. The Q-axis current feedback is given as a subtraction input of the subtractor 75A, and a difference thereof from the first input of the subtractor 75A is given to the Q-axis current controller 76A. The D-axis current feedback is given as a third input of the adder/subtractor 75B. The difference between the sum of the first input and the second input of the adder/subtractor 75B and the third input is given to the D-axis current controller 76B.

The Q-axis current controller 76A and the D-axis current controller 76B are, for example, PI controllers, which are adjusted and controlled so that their respective inputs are minimized, and output Q-axis voltage command and D-axis voltage command respectively, and provide them to 2-phase to 3-phase converter 77. The 2-phase to 3-phase converter 77 converts the Q-axis voltage command and the D-axis voltage command into a three-phase voltage command using the reference phase e that is the output of the switch 74C, and gives the output to the PWM controller 78. The PWM controller 78 supplies a PWM-modulated gate signal to each power device of the inverter 32 so that the output voltage of each phase of the inverter 32 becomes this three-phase voltage command.

Hereinafter, the reference phase θ will be described. If the AC motor 5 is an induction motor, the slip calculator 80 determines the slip s of the induction motor from the magnetic flux reference and the torque current reference that is the output of the divider 73. By adding this slip s to the speed feedback by the adder 81, the output frequency of the inverter 32 is obtained, and by integrating this output frequency by the integrator 82, the reference phase θM of the input terminal voltage of the AC motor M is obtained. The reference phase θM that is the output of the integrator 87 is inputted to the first input of the switch 74C. Further, a reference phase θS synchronized with the voltage of the AC power supply which is an output of a PLL controller 84 described later is inputted to the second input of the switch 74C. The output of the switch 74C is the reference phase O. The switching signal S74C of the switch 74C is operated by the synchronous incorporation controller 83 described later. During the motor drive mode, the switching signal S74C of the switch 74C is set so that the output of the switch 74C selects the first input. Therefore, during this period, the reference phase OM of the input terminal voltage of the AC motor 5 becomes the reference phase θ, and is supplied to the 2-phase to 3-phase converter 77 and the 3-phase to 2-phase converter 79 via the switch 74C.

With the configuration described above, the AC motor 5 can be driven at a variable speed with the input switch 2 and the output switch 4 turned on. Moreover, the structure demonstrated above consists of the structural requirements for what is called vector control of the AC motor 5 except the switches 74A, 74B, and 74C. In this embodiment, the speed reference given from the outside is set at a predetermined rate so that the rotational speed increases from zero to the rotational speed equivalent when the AC motor 5 is directly driven by the AC power supply 1. The fundamental wave output frequency of the inverter 32 can be set to the same frequency as that of the AC power supply 1.

Next, the configuration related to synchronous incorporation, and reactive power control after synchronous incorporation will be described. The phase of the AC power supply 1 voltage detected by the voltage detector 14 is determined by the PLL controller 84 to obtain the reference phase θS. The PLL controller 84 is a phase synchronization circuit using a phase locked loop, and outputs a reference phase θS synchronized with the voltage of the AC power supply 1. Here, it is assumed that the reference phase θS is determined so that the same phase with the voltage phase of the AC power supply is the q axis and the component orthogonal thereto is the d axis. The synchronous incorporation controller 83 has, as monitoring inputs, a voltage of the AC power supply 1 detected by the voltage detector 14, a reference phase θS synchronized with the voltage of the AC power supply 1 as an output of the PLL controller 84, a three-phase voltage command that is the output of the 2-phase to 3-phase converter 77, and the reference phase θM of the input terminal voltage of the AC motor M that is the output of the integrator 82. The three-phase voltage command is a signal corresponding to the fundamental wave voltage output of the inverter 32. The synchronous incorporation controller 83 rises to a rotational speed equivalent when the AC motor 5 is directly driven by the AC power supply 1, and detects the frequency from the voltage of the AC power supply 1 detected by the voltage detector 14 when the frequency difference between above frequency and the frequency of the three-phase voltage command which is the output of the two-phase to three-phase converter 77, falls within a predetermined range, then so-called speed match control is performed. The speed match control is a control for making the voltage, frequency, and phase of the voltage of the AC power supply 1 and the fundamental wave of the output voltage of the inverter 32 coincide with each other. Here, the case where the speed match control is performed is referred to as a speed match mode. That is, when the AC motor 5 rises to a rotational speed corresponding to that when directly driven by the AC power supply 1, and when the difference of the frequency of the voltage of the AC power supply 1 detected by the voltage detector 14 from the frequency of the three-phase voltage command that is the output of the 2-phase to 3-phase converter become within a predetermined range, the motor drive mode is shifted to the speed match mode.

In the speed match mode, in order to make the frequency, voltage, and phase of the two signals coincide with each other, in this embodiment, the synchronous incorporation controller 83 outputs the speed fine adjustment signal Δωs, and give it to the second input of the adder/subtractor 71. In addition, to minimize the deviation between the voltage of the AC power supply 1 detected by the voltage detector 14 and the three-phase voltage command (corresponding to the fundamental wave of the output voltage of the inverter 32) which is the output of the 2-phase to 3-phase converter 77, a fine voltage adjustment signal Δv for adjustment is outputted and supplied as a d-axis correction current to the second input of the subtractor 75B. And when the frequency of the voltage of the AC power supply 1 detected by the voltage detector 14 and the voltage, frequency, and phase of the three-phase voltage command that is the output of the 2-phase to 3-phase converter 77 (reference phase θS and reference phase θM) are coincident (strictly, the deviation is within a predetermined allowable range), a synchronous incorporation command is outputted. The synchronous incorporation command in this case is a command for outputting the operation signal S6 to turn on the switch 6. The details of the speed match control function of the synchronous incorporation controller 83 are described in, for example, Patent Document 2 and Patent Document 3, so will not be described here.

When the switch 6 is turned on, the inverter 32 performs parallel operation with the AC power supply 1. After turning on the switch 6, the synchronous incorporation controller 83 outputs a control switching signal to switch the operation of the power converter 3 from the speed match operation mode to the reactive power control mode. That is, the synchronous incorporation controller 83 changes the switching signal S74A, to switch the output signal of the switching device 74A from the first input to the second input, changes the switching signal S74B, to switch the output signal of the switching device 74B from the first input to the second input, change the switching signal S74C, to switch the output signal of the switch 74C from the first input to the second input, and further set the outputs of the speed fine adjustment signal Δωs and the voltage fine adjustment signal Δv to zero. That is, the output of the switching device 74A is changed from the output of the divider 73 to 0, the output of the switching device 74B is changed from the output of the magnetic flux current converter 73A to the output of the reactive power controller 87, and the output of the switching device 74C is further changed from the output of the integrator 82 to the output of the PLL controller 84, respectively. Here, the input switch 2 is kept on.

As described above, the output of the switch 74A becomes 0 in the reactive power control mode. The output of the switch 74A corresponds to the torque current reference, and becomes the q-axis current reference in the q-axis current control loop of the inverter 32. Since the output voltage phase of the inverter 32 and the voltage phase of the AC power supply 1 are synchronized, the q-axis current component output from the inverter 32, that is, the effective current component becomes to be zero.

Here, the reactive power controller 87 will be described. The output of the current detector 13 and the output of the voltage detector 14 are inputted to the reactive detector 85, and the reactive power detector 85 detects the reactive power passing through the current detector 13. That is, in this embodiment, the total reactive power of the AC motor 5 and the power converter 3 is detected. The output of the reactive power detector 85 is inputted to a subtraction terminal of the subtractor 86. An externally set reactive power reference is inputted to an addition terminal of the subtractor 86. The difference between the reactive power reference and the reactive power detected by the detector 85 is inputted to the reactive power controller 87. The reactive power controller 87 is, for example, a PI controller. Then, adjustment control is performed so that the given difference is minimized, and the output is outputted to the second input of the switch 74B. In the reactive power control mode, the output of the switch 74B is the second input. The output of the switch 74B, that is the output of the reactive power controller 87 becomes the d-axis current reference in the d-axis current control loop of the inverter 32. Since the output voltage phase of the inverter and the voltage phase of the AC power supply 1 are synchronized, the d-axis current component output from the inverter 32 is a reactive current component. Therefore, in the reactive power control mode, the q-axis current that is the active current output from the inverter 32 is 0, and the d-axis current that is the reactive current is controlled to be the output of the reactive power controller 87. In other words, the power loss consumed by the power converter 3 is fed from the diode converter 31, and the power converter 3 is invalid as an entire power system including the AC motor 5 to which the current detector 13 is connected. It functions as a reactive power control device that outputs a reactive current that serves as a power reference.

For example, when the reactive power reference applied from the outside to the subtracter 86 is set to 0, the inverter 31 is set so that the reactive power generated in the power system connected to the current detector 13 becomes 0 in the reactive power control mode. Namely, it is possible to perform an operation in which the total power factor of the power for driving the AC motor 5 and the input power of the power converter 3 is 1.

Further, if comprised so that the output of the reactive power detector that detects reactive power generated in another power system connected to the AC power supply 1 and connected to another load L (not shown) is connected to the subtraction terminal of the subtractor 86, the power converter 3 can control the reactive power of another electric power system in reactive power control mode. If the drive system of AC motor 5 is connected to another power system, power converter 3 can perform an operation that compensates not only reactive power of drive system of AC motor 5 but also reactive power of the load L.

Embodiment 2

Figure 2:
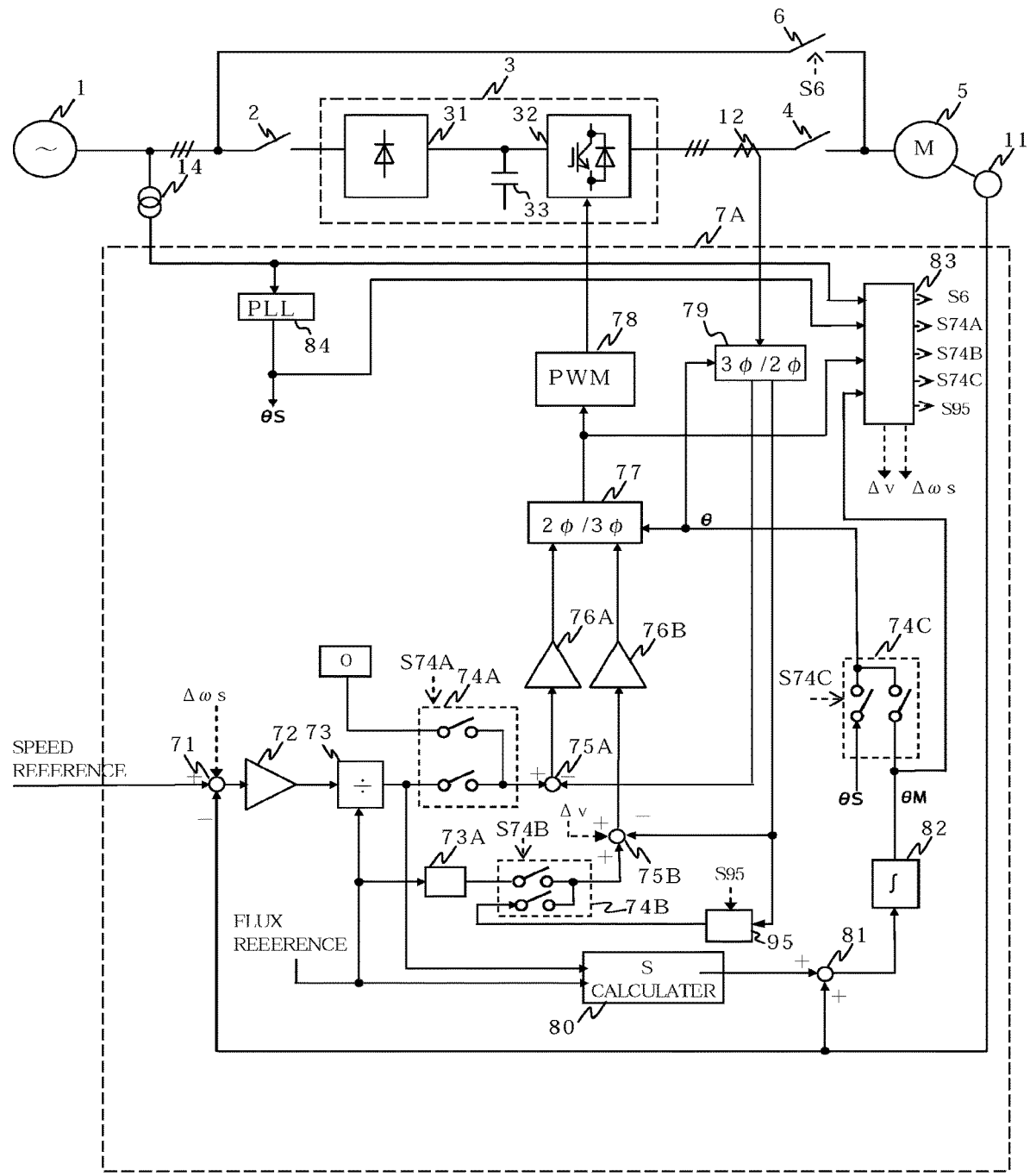
FIG. 2 is a circuit configuration diagram showing Embodiment 2 of the power conversion apparatus according to the present invention.

FIG. 2 is a circuit configuration diagram of the power conversion apparatus according to the second embodiment of the present invention. About each part of this embodiment 2, the same part as each part of the power converter which concerns on embodiment 1 of this invention of FIG. 1 is shown with the same symbol, and the description is omitted. The differences between the second embodiment and the first embodiment are as follows. First, the current detector 13 in the first embodiment is omitted. Further, the reactive power detector 85, the subtractor 86, and the reactive power controller 87 provided in the control unit 7 in the first embodiment are also omitted from the control unit 7A. Then, a holding circuit 95 is added in the control unit 7A of the present embodiment. The signal input of the holding circuit 95 is a D-axis current feedback which is the output of the 3-phase to 2-phase converter 79, and the signal output of the holding circuit 95 is connected to the second input of the switch 74B. Then, the signal holding operation of the holding circuit 95 is made in accordance with the holding control signal S95 outputted from the synchronous incorporation controller 83.

The operation of the second embodiment will be described below. The steps up to the motor drive mode and the speed match mode are the same as in the first embodiment. In these modes, the holding control signal S95 outputted from the synchronous incorporation controller 83 is set so that the holding circuit 95 does not hold the input. In the speed match mode, as in the first embodiment, to coincident the frequency and the phase of the two signals between the voltage of the AC power supply 1 detected by the voltage detector 14 and the three-phase voltage command outputted from the 2-phase to 3-phase converter 77, the synchronous incorporation controller 83 outputs the speed fine adjustment signal Δωs and applies it to the second input of the adder/subtractor 71.

Further, the synchronous incorporation controller 83 outputs the voltage fine adjustment signal Δv corresponding to the deviation between the voltage of the AC power supply 1 detected by the voltage detector 14 and the three-phase voltage command (corresponding to the fundamental wave of the output voltage of the inverter 32) which is the output of the 2-phase to 3-phase converter 77. The fine adjustment signal Δv is supplied as the d-axis correction current to the second input of the subtractor 75B. And when the frequency, the voltage, and the phase (reference phase θS and reference phase θM) of the voltage of the AC power supply 1 detected by the voltage detector 14 and these of the three-phase voltage command that is the output of the two-phase to three-phase converter 77 are coincident (strictly, the deviation is within a predetermined allowable range), a synchronous incorporation command is outputted, the holding control signal S95 is changed, the holding circuit 95 holds the input signal, and outputs the signal equal to the held input signal.

At the same time, an operation signal S6 is outputted so as to turn on the switch 6. When the switch 6 is turned on, the inverter 32 performs a parallel operation with the AC power supply 1. After turning on the switch 6, the synchronous incorporation controller 83 issues a control switching signal to switch the operation of the power converter 3 from the speed match mode to the magnetic flux current compensation mode which is a special case of the reactive power control mode. That is, the synchronous incorporation controller 83 changes the switching signal S74A to switch the output signal of the switch 74A from the first input to the second input, changes the switching signal S74B to switch the output signal of the switch 74B from the first input to the second input, change the switching signal S74C to switch the output signal of the switch 74C from the first input to the second input, and further set the outputs of the speed fine adjustment signal Δωs and the voltage fine adjustment signal Δv to zero.

Here, since the turn-off operation of the switch 6 is accompanied by a mechanical operation, it actually involves a delay of several ms or more from the switching of the operation signal S6. On the other hand, the operation in which the holding control signal S95 is changed and the holding circuit 95 holds the input signal is performed by an electronic circuit level operation and is fast. Since the control unit 7A is constituted by, for example, a microprocessor, the delay time is about the calculation time of the microprocessor and can be easily realized with 1 ms or less. Therefore, when the holding control signal S95 and the operation signal S6 are switched simultaneously, the holding circuit 95 holds the d-axis current feedback that is the output of the 3-phase to 2-phase converter 77 immediately before the synchronous incorporation. If the operation time of the microprocessor is 1 ms or more, or if the switch 6 uses a semiconductor switch and there is a possibility that the delay relationship is reversed, the delay relationship can be satisfied by giving a delay at the time of switching transmission of the operation signal S6.

In this way, the output of the switch 74A is changed from the output of the divider 73 to 0, the output of the switch 74B is changed from the output of the magnetic flux current converter 73A to the output of the holding circuit 95, and the output of the switch 74C is further changed from the output of the integrator 82 to the output of the PLL controller 84, respectively. Here, the input switch 2 is kept on.

Thus, the output of the switch 74A becomes 0 in the magnetic flux current compensation mode. The output of the switch 74A corresponds to the torque current reference, and becomes the q-axis current reference in the q-axis current control loop of the inverter 32. Since the output voltage phase of the inverter and the voltage phase of the AC power supply 1 are synchronized, the q-axis current component output from the inverter 32, that is, the effective current component becomes to be zero.

Since the holding circuit 95 holds the d-axis current feedback that is the output of the 3-phase to 2-phase converter 79 immediately before the synchronous incorporation, the output of the holding circuit 95 is the value of d-axis current feedback immediately before the synchronous incorporation. That is, the value of the d-axis current feedback immediately before the synchronous incorporation becomes the d-axis current reference in the d-axis current control loop of the inverter 32. The d-axis current of the inverter 32 immediately before the synchronous incorporation is a component corresponding to the excitation current of the AC motor 5. Since the output voltage phase of the inverter and the voltage phase of the AC power supply 1 are synchronized, the d-axis current component output from the inverter 32 is an excitation current component of the AC motor 5. Therefore, if the load condition of the AC motor 5 does not change, the q-axis current that is the effective current output from the inverter 32 in the magnetic flux current compensation mode becomes 0, and the d-axis current that is the reactive current is controlled to compensate the excitation current.

Embodiment 3

Figure 3:
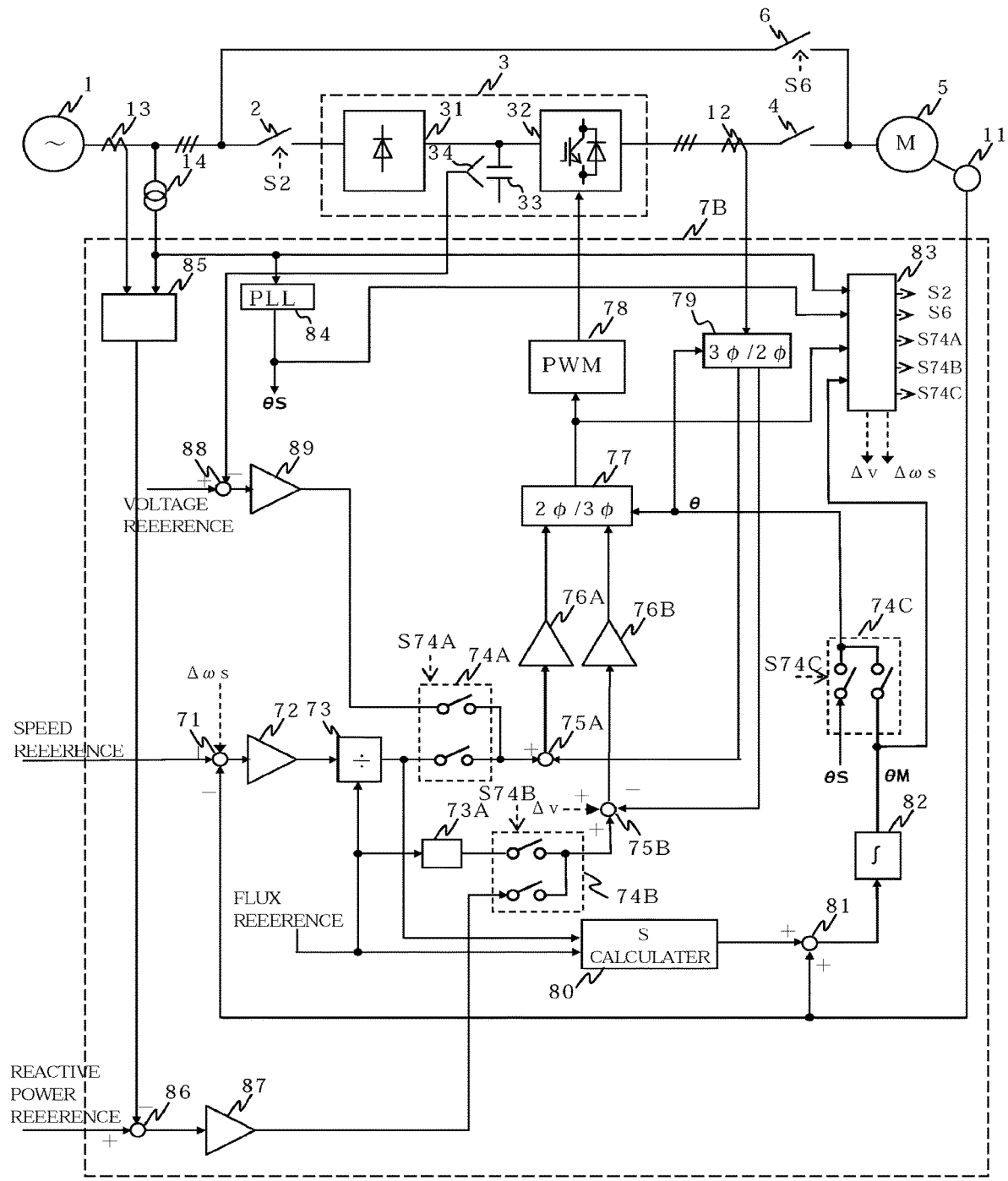
FIG. 3 is a circuit configuration diagram showing Embodiment 3 of the power conversion apparatus according to the present invention.

FIG. 3 is a circuit configuration diagram of the power conversion apparatus according to the third embodiment of the present invention. The same parts of the third embodiment as those of the power conversion apparatus according to the first embodiment of the present invention shown in FIG. 1 are denoted by the same symbols, and the description thereof is omitted. The third embodiment differs from the first embodiment in the following points. First, a DC voltage detector 34 for detecting a DC voltage output from the diode converter 31 is provided in the control unit 7B. Then, a subtracter 88 for calculating the difference between the DC voltage and the set voltage reference is provided. In addition, a voltage controller 89 is provided to output the q-axis current reference by controlling the difference to be a minimum and to provide the output to the second input of the switch 74A. Further, the input switch 2 becomes to be operated by the switching signal S2 from the synchronous incorporation controller 83.

The operation of the third embodiment will be described below. First, the input switch 2 is in the closed state, and after entering the motor drive mode, the operation mode is changed to the speed match mode. This operation for switching to the reactive power control mode is the same as in the first embodiment. The difference from the first embodiment is that when switching to the reactive power control mode, the synchronous incorporation controller 83 changes the switching signal S2 to turn off the input switch 2, and the switch 74A selects the q-axis current reference, which is the output of the voltage controller 89, instead of 0 as the second input. Here, for example, the set voltage reference given to the subtracter 88 is set to a voltage corresponding to the DC output of the diode converter 31 in the speed match operation mode. In this way, the inverter 32 is regeneratively operated so that the voltage applied to the DC capacitor 33 becomes the set voltage reference, and an effective current corresponding to the power loss in the power converter 3 flows into the inverter 32 from the AC power supply 1. Note that reactive power control is exactly the same as that in the first embodiment, and a description thereof will be omitted.

Embodiment 4

Figure 4:
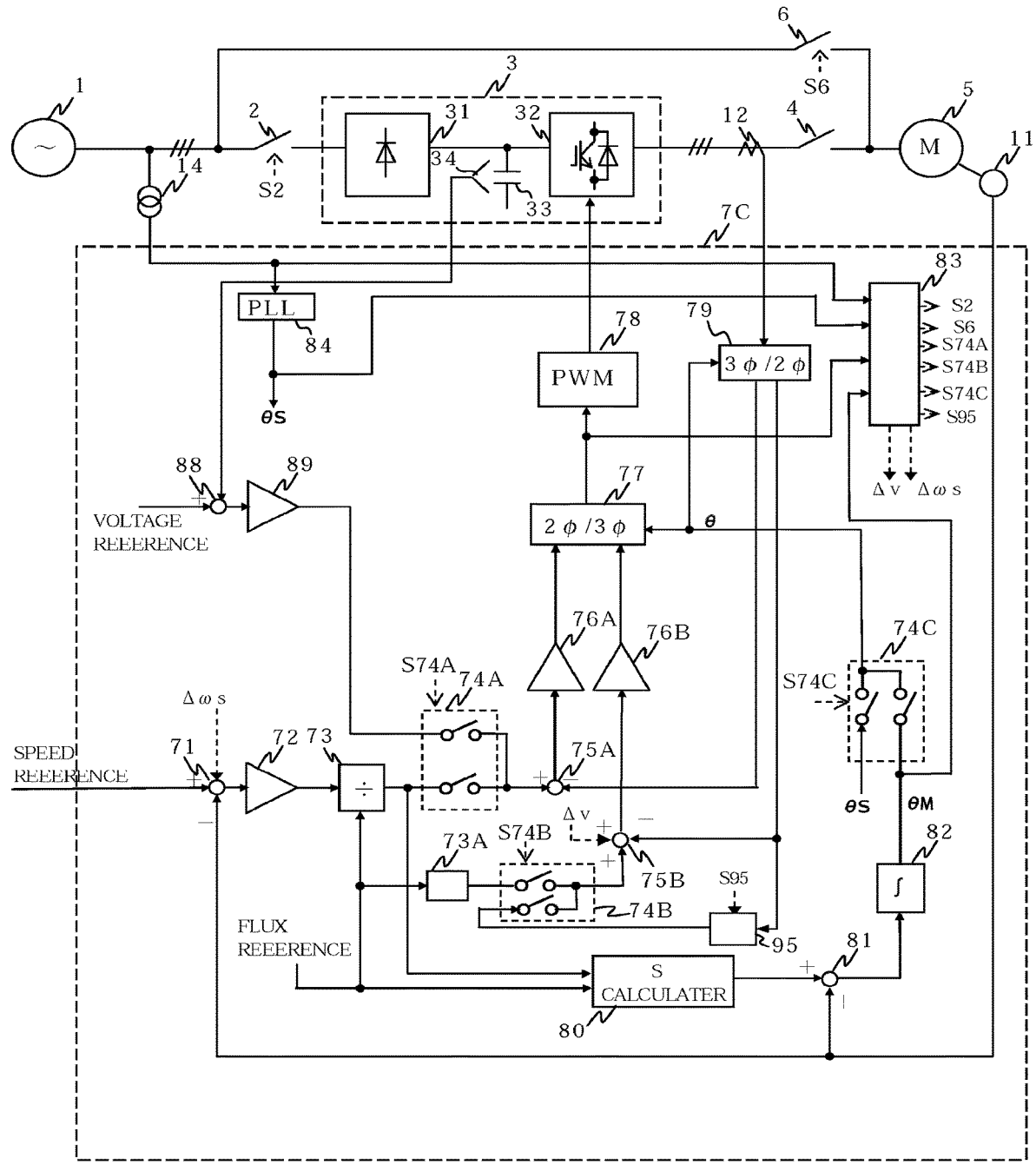
FIG. 4 is a circuit configuration diagram showing Embodiment 4 of the power conversion apparatus according to the present invention.

FIG. 4 is a circuit configuration diagram of the power conversion apparatus according to the fourth embodiment of the present invention. In each part of the fourth embodiment, the same parts as those of the power conversion apparatus according to the second embodiment of the present invention shown in FIG. 2, are denoted by the same symbols, and the description thereof is omitted. Embodiment 4 differs from embodiment 2 in the followings. First, a DC voltage detector 34 for detecting a DC voltage output from the diode converter 31 is provided in the control unit 7C. Then, a subtracter 88 for calculating a difference between the detected voltage and the set voltage reference is provided. And a voltage controller 89 is provided to output the q-axis current reference by controlling the difference to be a minimum and to provide the output to the second input of the switch 74A. Further, the input switch 2 is operated by a switching signal S2 from the synchronous incorporation controller 83. For example, the set voltage reference given to the subtracter 88 is set to a voltage corresponding to the DC output of the diode converter 31 in the speed match mode.

Since the operation of the fourth embodiment is a combined operation of the second and third embodiments, the description thereof is omitted. According to the fourth embodiment, in the reactive power control mode, the reactive current of the power converter 3 is controlled in the magnetic flux current compensation mode, and the voltage applied to the DC capacitor 33 becomes the set voltage reference.

Embodiment 5

Figure 5:
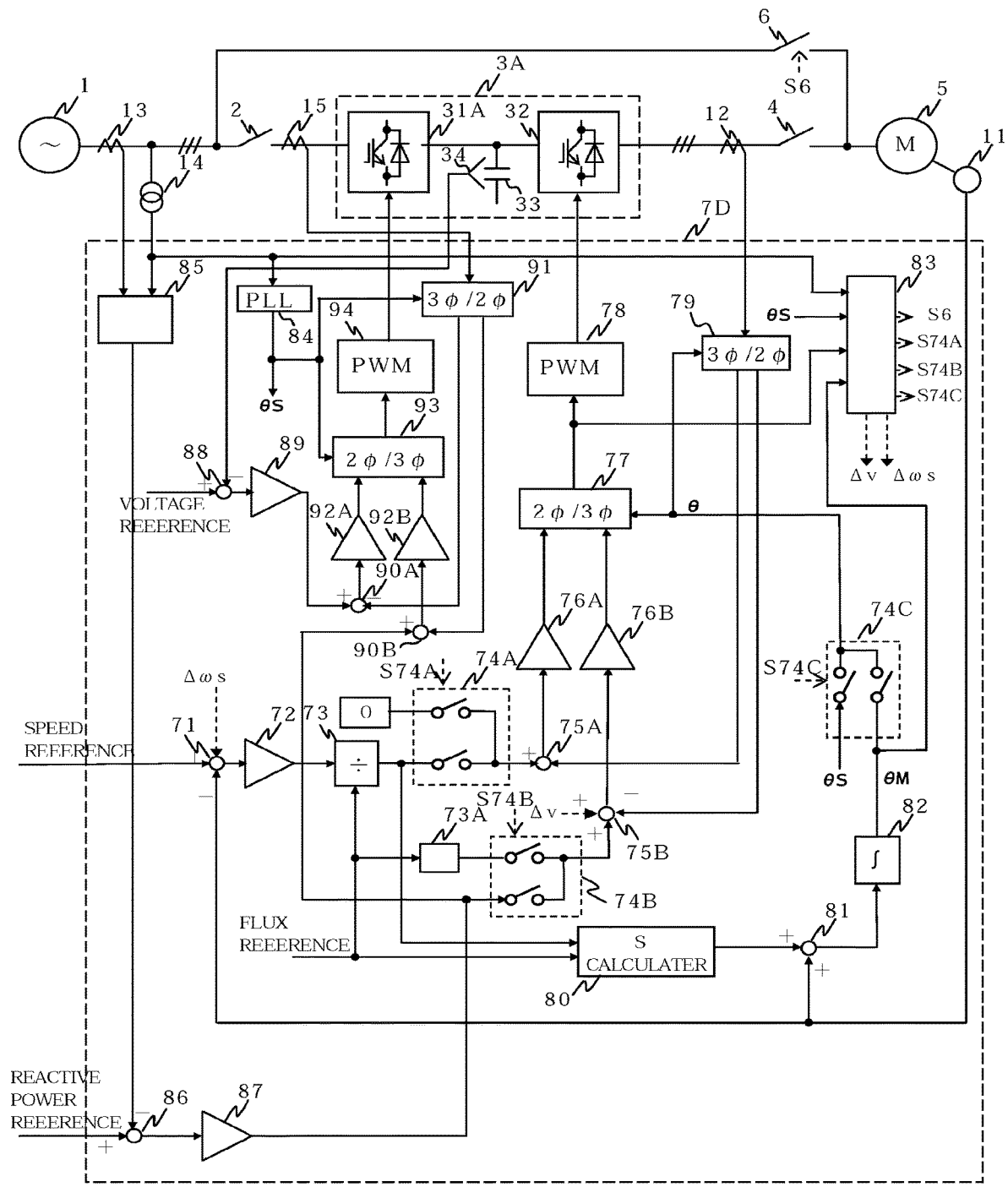
FIG. 5 is a circuit configuration diagram showing Embodiment 5 of the power conversion apparatus according to the present invention.

FIG. 5 is a circuit configuration diagram of the power conversion apparatus according to the fifth embodiment of the present invention. In each part of the fifth embodiment, the same parts as those of the power conversion apparatus according to the first embodiment of the present invention shown in FIG. 1, are denoted by the same symbols, and the description thereof is omitted. The main difference between the fifth embodiment and the first embodiment is that, in the power converter 3A, the diode converter 31 is changed to a self-excited converter 31A, and a control circuit for the self-excited converter 31A is added to the control unit 7D, and in order to control the current of the self-excited converter 31A, a current detector 15 is provided at the input of the self-excited converter 31A.

The q-axis effective current control in the self-excited converter 31A is performed by comparing the voltage detected by the DC voltage detector 34 with the voltage reference by the subtractor 88, as the inverter 32 in the third embodiment performs, and the voltage controller 89 outputs an effective current reference so that the difference, an output of the subtractor 88 is minimized. In addition, the d-axis reactive current control is performed by comparing the reactive power detected by the reactive power detector 85 with the reactive power reference by the subtractor 86, as the inverter 32 performs in the first embodiment, and the reactive power controller 87 outputs the reactive current reference so that the difference, an output of the subtractor 86 is minimized. The 3-phase to 2-phase converter 91 converts the three-phase feedback current into the q-axis and d-axis feedback currents according to the reference phase θs detected by the PLL controller 84. The effective current reference output from the voltage controller 89 is subtracted from the q-axis feedback current by a subtractor 90A, and a q-axis current controller 92A outputs a q-axis voltage command to a 2-phase to 3-phase converter 93 so that this difference is minimized. Similarly, the reactive current reference output by the reactive power controller 87 is subtracted from the d-axis feedback current by a subtractor 90B, and a d-axis current controller 92B outputs a d-axis voltage command to the 2-phase to 3-phase converter 93 so that this difference is minimized. The 2-phase to 3-phase converter 93 converts the two-phase voltage command into a three-phase AC voltage command in accordance with the reference phase θS detected by the PLL controller 84 and supplies the converted voltage command to a PWM controller 94. The PWM controller 94 supplies a PWM-modulated gate signal to each power device of the self-excited converter 31A so that the input voltage of each phase of the self-excited converter 31A becomes this three-phase voltage command.

In this configuration, when the synchronous incorporation controller 83 performs synchronous incorporation to switch the power converter 3 from the speed match mode to the reactive power control mode, it switches the input of the switch 74A from the Q-axis current reference that is the output of the divider 7 and is the first input of the switch 74A, to 0 which is the second input of the switch 74A, and switches the input of the switch 74B from the D-axis current reference that is the output of the magnetic flux current converter 73A and is the first input of the switch 74B, to the D-axis current reference that is the output of the reactive power controller 87 and is the second input of the switch 74B, and switches the input of the switch 74C from the reference phase θM that is the output of the integrator 82 and is the first input of the switch 74C, to the reference phase OS that is the output of the PLL controller 84 and is the second input of the switch 74C.

According to the above configuration, the reactive power of the power supply system can be controlled by the self-excited converter 31A even in the motor drive mode in which the AC motor 5 is driven by the inverter 32. Normally, the self-excited converter 31A has almost the same capacity as the inverter 32, and therefore, it becomes possible to perform reactive power control with double capacity by switching the control after the synchronous incorporation with the AC motor 5.

Embodiment 6

Figure 6:
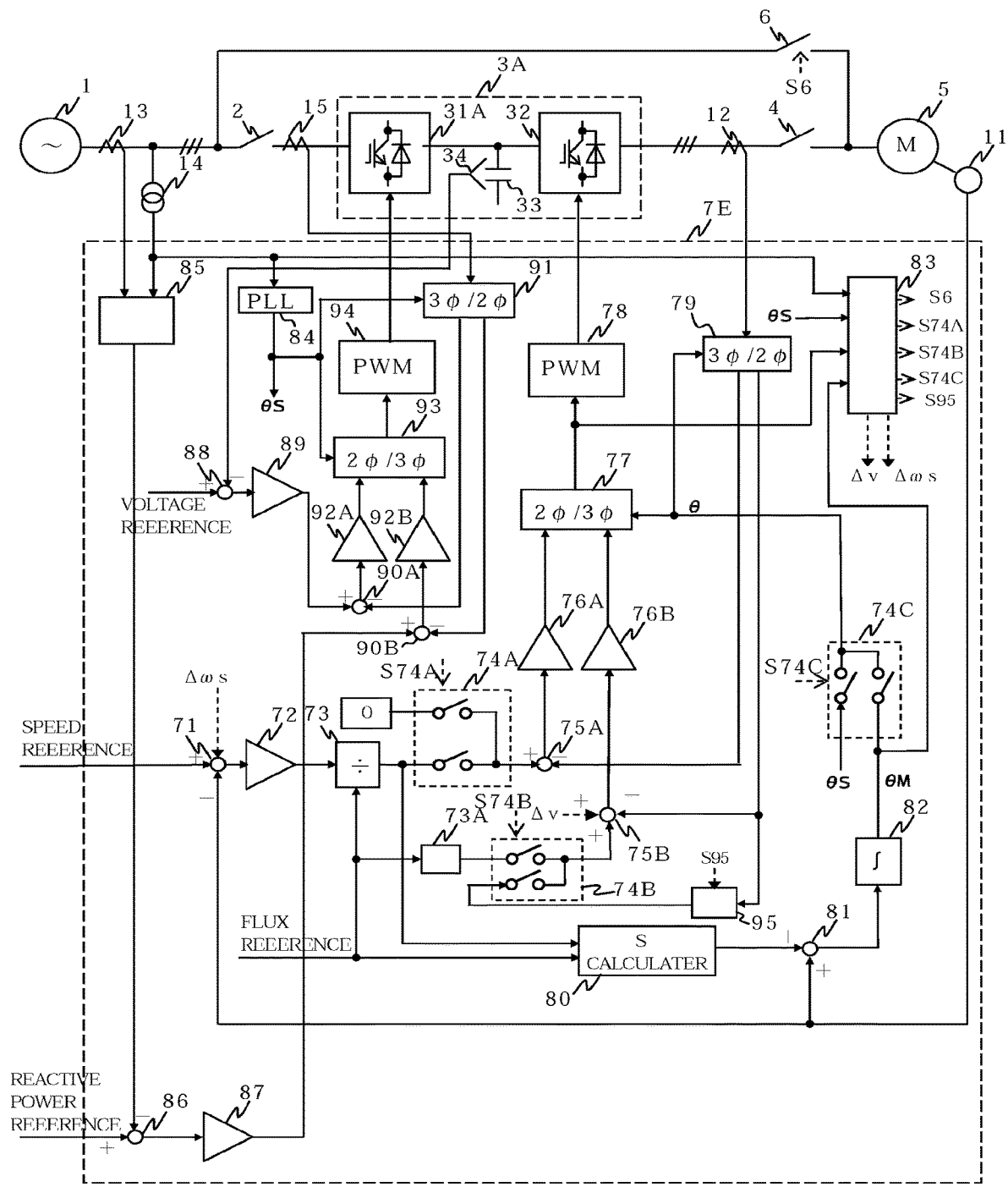
FIG. 6 is a circuit configuration diagram showing Embodiment 6 of the power conversion apparatus according to the present invention.

FIG. 6 is a circuit configuration diagram of the power conversion apparatus according to the sixth embodiment of the present invention. About each part of this embodiment 6, the same part as each part of the power converter which concerns on embodiment 5 of this invention of FIG. 5 is shown with the same symbol, and the description is omitted. The main difference between the sixth embodiment and the fifth embodiment is that in the control unit 7E, a holding circuit 95 is added. An input signal of the holding circuit 95 is D-axis current feedback that is the output of the 3-phase to 2-phase converter 79, and the signal output of the holding circuit 95 is connected to the second input of the switch 74B, and a signal holding operation of the holding circuit 95 is in accordance with the holding control signal S95 outputted from the synchronous incorporation controller 83.

Since the operation of the sixth embodiment is a combined operation of the fifth embodiment and the second embodiment, the description thereof is omitted. According to the sixth embodiment, the self-excited converter 31A performs the reactive power control and the constant DC voltage control regardless of the motor drive mode, and the inverter 32 is controlled in the reactive power control mode so that the reactive current is controlled to be zero in the magnetic flux current compensation mode.

While certain embodiments have been described, these embodiments have been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

For example, the speed detector 11 in each embodiment may be replaced to a position detector. In that case, the speed may be obtained by differentiating the position. Alternatively, the speed may be obtained indirectly by calculation without providing a speed detector.

In addition, the reactive power control in each embodiment has been described as controlling the reactive power of the power system to a desired value, however it is also possible to control the power factor of the power system and to suppress and control harmonics. When controlling the power factor, the reactive power detector 85 may be replaced with a power factor detector. In the case of harmonic suppression control, the harmonic current input to the power system is detected, and a harmonic suppression controller that can be minimized the detected harmonic current is provided in place of the reactive power controller 87. Note that the harmonic suppression controller may be provided in parallel while utilizing the control loop of the reactive power controller 87.

In each of the embodiments, it has been described that after the switch 6 is turned on and synchronous incorporation is performed, the inverter 32 is switched to the reactive power control mode while the output switch 4 is in the on state. The output switch 4 may be turned off once, and after the control system is switched to the reactive power control mode by the switches 74A, 74B, and 74C, the output switch 4 may be turned on again.

In addition, after the switch 6 is turned on and synchronized, the timing for switching the inverter 32 to reactive power control is performed by a timer, for example. It is preferable that the set time of the timer be at least larger than the time constant of the control system of the inverter 32. Further, it may be switched by detecting that the transient change of the output current of the inverter 32 has settled without depending on the timer.

Also, when the control system is switched to the reactive power control mode, a soft start function maybe added to the control system in order to prevent transient disturbance.

In each embodiment, the output of the 2-phase to 3-phase converter 77 is used for the inverter 32 side to detect the coincidence of the voltage between the AC power supply 1 and the inverter 32. However, it maybe comprised so that the output voltage of the inverter 32 is directly detected.

In each embodiment, the fine voltage adjustment signal Δv is supplied as the d-axis correction current to the second input of the adder/subtractor 75B. However, if the output voltage of the inverter 32 can be corrected, the q-axis correction current may be used. Alternatively, it may be added to the input or output of the PWM controller 78.

Further, for example, in the operation of reactive power control, a limiter may be provided for the reactive current reference Id in consideration of the case where the reactive current reference Id exceeds the capacity of the inverter 32.

In each embodiment, only the description of switching from the motor drive mode to the reactive power control mode has been given. However, when the control procedure is reversed, it is obviously possible to switch from the reactive power control mode to the motor drive mode.

In each embodiment, it has been described that the inverter 32 in the motor drive mode is operated by vector control. However, if the condition for performing synchronous incorporation without any problem is satisfied, there is no need for vector control, it may be V/f constant control.

In the fifth and sixth embodiments, when the reactive power control mode is set, the two self-excited converters 31A and the inverter 32 operate in parallel with the same function. Therefore, for example, it is possible to perform switching such that the mutual control is switched.

Further, in each of the embodiments, the AC motor 5 and the power converter 3 are described as being 1:1. However, for example, even with a system configuration that plurality of AC motors are sequentially activated by one power converter and synchronous incorporation is performed, it is possible to operate the inverter 32 by switching to the reactive power control mode after all the motor drive mode are completed.

EXPLANATION OF SYMBOLS

1 AC power supply
2 Input switch
3, 3A Power converter
4 Output switch
5 AC motor
6 Switch
7, 7A, 7B Control unit
11 Speed detector
12 Current detector
13 Current detector
14 Voltage detector
31 Diode converter
31A Self-excited converter
32 Inverter
33 DC capacitor
34 DC voltage detector
71, 75B Adder/subtracter
72 Speed controller
73 Divider
73A Magnetic flux current converter
74A, 74B, 74C Switch
75A Subtractor
76A, 76B Current controller
77 2-phase to 3-phase converter
78 PWM controller
79 3-phase to 2-phase converter
80 Slip calculator
81 Adder
82 Integrator
83 Synchronous incorporation controller
84 PLL controller
85 Reactive power detector
86 Subtractor
87 Reactive power controller
88 Subtractor
89 Voltage controller
90A, 90B Subtractor
91 3-phase to 2-phase converter
92A, 92B Current controller
93 2-phase to 3-phase converter
94 PWM controller
95 Holding circuit

The invention claimed is:
1. A power conversion apparatus comprising:
a converter that receives a three-phase AC power supply and outputs a DC voltage;
an inverter connected to the output of the converter and drives an AC motor via an output switch;

a power switch for directly driving the AC motor with the AC power supply;

a first current detector for detecting an output current of the inverter;

a voltage detector and a second current detector for detecting the voltage and current of the power supply system on the input side of the converter, respectively, and a control unit for controlling the three-phase output voltage of the inverter based on a first three-phase voltage command, the control unit involves:

a speed controller that outputs a first Q-axis current reference by controlling so that a deviation between a given speed reference and a speed feedback obtained directly or indirectly of the AC motor is minimized;

a first 3-phase to 2-phase converter for converting a three-phase current detected by the first current detector into a first Q-axis current feedback and a first D-axis current feedback based on a first reference phase;

a first Q-axis current controller that outputs a first Q-axis voltage reference by controlling so that the deviation between the first Q-axis current reference via the first switch and the first Q-axis current feedback is minimized;

a first D-axis current controller that outputs a D-axis voltage reference by controlling so that the deviation between a first D-axis current reference corresponding to a given magnetic flux reference via a second switch, and the first D-axis current feedback is minimized;

a first 2-phase to 3-phase converter that converts the first Q-axis voltage reference and the first D-axis voltage reference into the first three-phase voltage command based on the first reference phase;

an operation circuit for obtaining an output frequency of the inverter by computation from the speed feedback, the first Q-axis current reference, and the magnetic flux reference, and integrates the obtained output frequency to obtain the first reference phase;

a phase synchronization circuit for obtaining a second reference phase by using the output of the voltage detector as an input;

a third switch for switching between the first reference phase and the second reference phase;

a reactive power detection circuit for detecting reactive power of the power supply system from the voltage detector and the second current detector;

a reactive power controller that outputs a second D-axis current reference by controlling so that the deviation between the reactive power and a predetermined reactive power reference is minimized, and a synchronous incorporation controller for switching the AC motor from driving by the inverter to driving by the AC power supply, wherein, the synchronous incorporation controller adjusts the speed of the AC motor and the output voltage of the inverter to match the voltage, output frequency and phase of the AC power supply and the inverter, and turns on the power switch to make the synchronous incorporation, and then the first to third switches are switched to perform reactive power control of the power system including the drive system of the AC motor by the inverter.

2. The power conversion apparatus according to claim 1, wherein, the converter is a diode converter, and the synchronous incorporation controller changes the input of the first switch from the first Q-axis current reference to 0, changes the input of the second switch from the first D-axis current reference to the second D-axis current reference, and changes an input of the third switch from the first reference phase to the second reference phase, after the synchronous incorporation.

3. The power conversion apparatus according to claim 1 further comprising:

an input switch on the input side of the converter;

a DC voltage detector for detecting the output voltage of the converter, and a voltage controller that outputs a second Q-axis current reference by controlling so that a deviation between the detected voltage and a predetermined voltage reference is minimized, wherein, the converter is a diode converter, and the synchronous incorporation controller turns off the input switch, changes the input of the first switch from the first Q-axis current reference to the second Q-axis current reference, changes the input of the second switch from the first D-axis current reference to the second D-axis current reference, and changes an input of the third switch from the first reference phase to the second reference phase, after the synchronous incorporation.

4. The power conversion apparatus according to claim 1 further comprising:

an input switch on the input side of the converter;

a DC voltage detector for detecting the output voltage of the converter, and a voltage controller that outputs a second Q-axis current reference by controlling so that a deviation between the detected voltage and a predetermined voltage reference is minimized, wherein, the converter is a diode converter, and the synchronous incorporation controller turns off the input switch, changes the input of the first switch from the first Q-axis current reference to the second Q-axis current reference, changes the input of the second switch from the first D-axis current reference to the third D-axis current reference, and changes an input of the third switch from the first reference phase to the second reference phase, after the synchronous incorporation.

5. The power conversion apparatus according to claim 1, wherein, the converter is a self-excited converter with an input current detector on the input side of the converter, and in order to control the three-phase output voltage of the self-excited converter based on the second three-phase voltage command, the controller further comprising:

a second 3-phase to 2-phase converter for converting the three-phase current detected by the input current detector into a second Q-axis current feedback and a second D-axis current feedback based on the second reference;

a DC voltage detector for detecting the output voltage of the self-excited converter;

a voltage controller that outputs a second Q-axis current reference by controlling so that the deviation between the detected voltage and a predetermined voltage reference is minimized;

a second Q-axis current controller that output a second Q-axis voltage reference by controlling so that the deviation between the second Q-axis current reference and the second Q-axis current feedback is minimized;

a second D-axis current control that outputs a second D-axis voltage reference by controlling so that the deviation between the second D-axis current reference and the D second-axis current feedback is minimized, and a second 2-phase to 3-phase converter for converting the second Q-axis voltage reference and the second D-axis voltage reference into the second three-phase voltage command of the self-excited converter based on the second reference phase, wherein the synchronous incorporation controller changes the input of the first switch from the first Q-axis current reference to 0, changes the input of the second switch from the first D-axis current reference to the second D-axis current reference, and changes an input of the third switch from the first reference phase to the second reference phase, after the synchronous incorporation.

6. A power conversion apparatus comprising:

a converter that receives a three-phase AC power supply and outputs a DC voltage;

an inverter connected to the output of the converter and driving an AC motor via an output switch;

a power switch for directly driving the AC motor with the AC power supply;

a first current detector for detecting an output current of the inverter;

a voltage detector for the voltage of the power supply system on the input side of the converter, and a control unit for controlling the three-phase output voltage of the inverter based on a first three-phase voltage command, the control unit involves:

a speed controller that outputs a first Q-axis current reference by controlling so that a deviation between a given speed reference and a speed feedback obtained directly or indirectly of the AC motor is minimized;

a first 3-phase to 2-phase converter for converting a three-phase current detected by the first current detector into a first Q-axis current feedback and a first D-axis current feedback based on a first reference phase;

a first Q-axis current controller that outputs the first Q-axis voltage reference by controlling so that a deviation between the first Q-axis current reference via the first switch and the first Q-axis current feedback is minimized;

a first D-axis current controller that outputs a D-axis voltage reference by controlling so that a deviation between a first D-axis current reference corresponding to a given magnetic flux reference via a second switch and the first D-axis current feedback is minimized;

a first 2-phase to 3-phase converter that converts the first Q-axis voltage reference and the first D-axis voltage reference into the first three-phase voltage command based on the first reference phase;

an operation circuit for obtaining an output frequency of the inverter by computation from the speed feedback, the first Q-axis current reference, and the magnetic flux reference, and integrates the obtained output frequency to obtain the first reference phase;

a phase synchronization circuit for obtaining a second reference phase by using the output of the voltage detector as an input;

a third switch for switching between the first reference phase and the second reference phase;

a holding circuit for holding the first D-axis current feedback at a predetermined timing and outputs a third D-axis current reference, and a synchronous incorporation controller for switching the AC motor from driving by the inverter to driving by the AC power supply, wherein, the synchronous incorporation controller adjusts the speed of the AC motor and the output voltage of the inverter to match the voltage, output frequency and phase of the AC power supply and the inverter, and turns on the power switch to make a synchronous incorporation, and then, switches the first to third switches to perform reactive power control by the inverter so as to compensate the excitation current of the AC motor, and the predetermined timing is set to the timing immediately before the synchronous incorporation.

7. The power conversion apparatus according to claim 6, wherein, the converter is a diode converter, and the synchronous incorporation controller changes the input of the first switch from the first Q-axis current reference to 0, changes the input of the second switch from the first D-axis current reference to the third D-axis current reference, and changes the input of the third switch from the first reference phase to the second reference phase, after the synchronous incorporation.

8. The power conversion apparatus according to claim 6, wherein, the converter is a self-excited converter with an input current detector on the input side of the converter, and in order to control the three-phase output voltage of the self-excited converter based on the second three-phase voltage command, the controller further comprising:

a second 3-phase to 2-phase converter for converting the three-phase current detected by the input current detector into a second Q-axis current feedback and a second D-axis current feedback based on the second reference;

a DC voltage detector for detecting the output voltage of the self-excited converter;

a voltage controller that outputs a second Q-axis current reference by controlling so that the deviation between the detected voltage and a predetermined voltage reference is minimized;

a second Q-axis current controller that output a second Q-axis voltage reference by controlling so that the deviation between the second Q-axis current reference and the second Q-axis current feedback is minimized;

a second D-axis current control that outputs a second D-axis voltage reference by controlling so that the deviation between the second D-axis current reference and the D second-axis current feedback is minimized, and a second 2-phase to 3-phase converter for converting the second Q-axis voltage reference and the second D-axis voltage reference into the second three-phase voltage command of the self-excited converter based on the second reference phase, wherein the synchronous incorporation controller changes the input of the first switch from the first Q-axis current reference to 0, changes the input of the second switch from the first D-axis current reference to the third D-axis current reference, and changes an input of the third switch from the first reference phase to the second reference phase, after the synchronous incorporation.

\* \* \* \* \*